United States Patent Office 2,993,752
Patented July 25, 1961

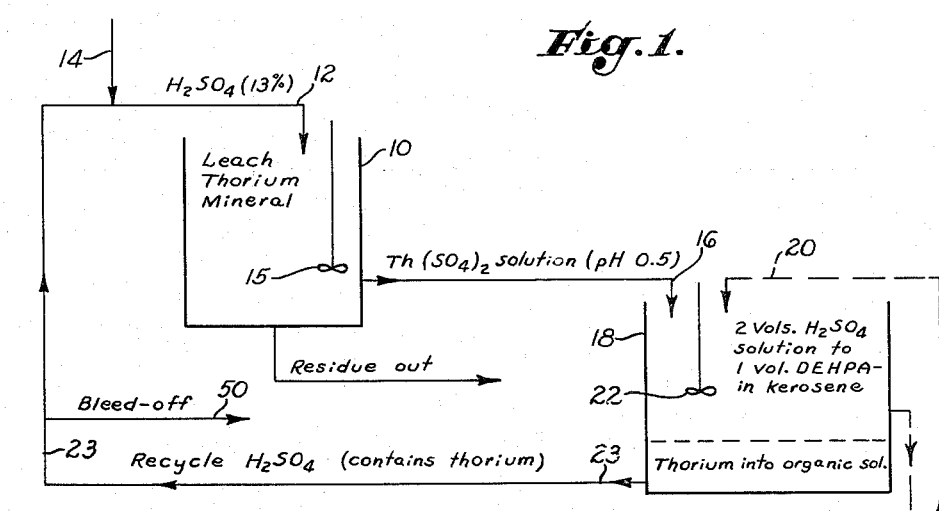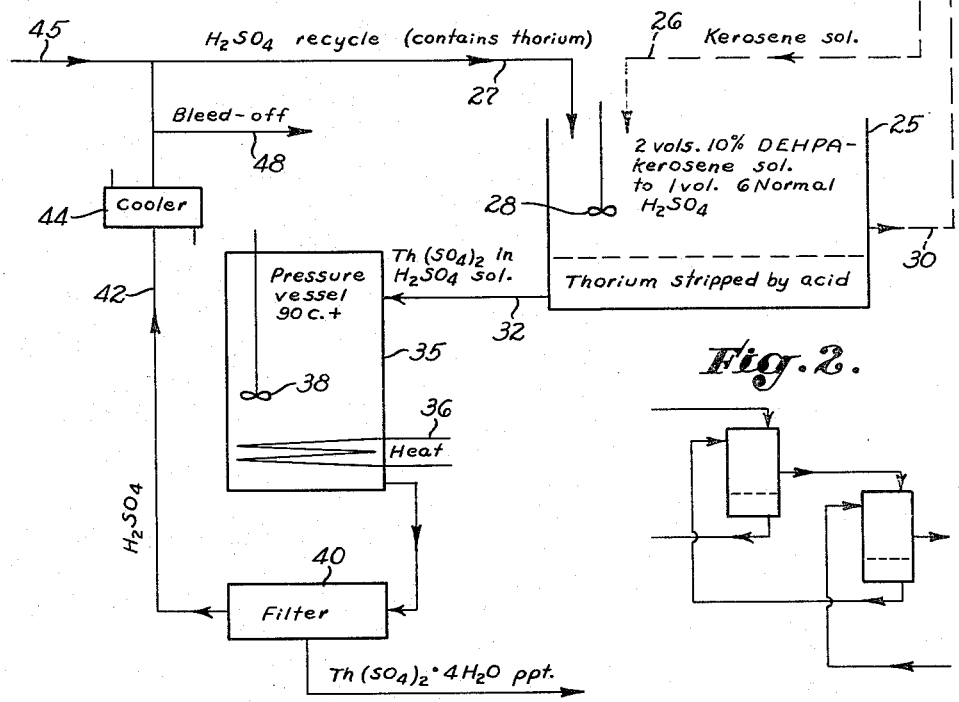

2,993,752
THORIUM RECOVERY PROCESS
Clifford J. Lewis and Edward Siegal, Lakewood, Colo., assignors to Dallas B. Lewis, Los Angeles, Calif.
Filed Dec. 24, 1956, Ser. No. 630,129
13 Claims. (Cl. 23—14.5)

This invention relates to the separation of mineral constituents from their ores, and more particularly to the recovery of thorium, or equivalent metals.

A particular object of this invention is to provide a method for the relatively easy recovery of a high percentage of thorium from thorium-containing minerals.

More particularly it is an object of this invention to leach thorium values from ores by dilute aqueous sulfuric acid solutions at normal or ambient temperatures, and concentrate the resultant thorium sulfate by selective solvent extractions, the major proportion of the thorium values being then recovered as sulfate by reason of the fact that such sulfate is relatively insoluble in hot strong aqueous sulfuric acid solution and therefore precipitated therefrom upon elevating the temperature of the solution into the neighborhood of its boiling point.

It is a still further object of the invention to provide a process for thorium recovery in which loss of thorium values not separable from given solutions is avoided by use of specific recycling procedures.

We have discovered that thorium sulfate in sulfuric acid solution, obtained by leaching thorium ores with sulfuric acid at normal temperatures, may be selectively separated from the sulfuric acid solution by appropriate immiscible organic solvents, used in smaller proportion than the acid solution, whereby to concentrate the thorium, in turn selectively dissolving the thorium from the organic solution by a still smaller proportion of relatively strong sulfuric acid solution, thereby further concentrating the thorium, and then precipitating thorium sulfate from the strong sulfuric acid solution by heating the latter to a temperature of at least about 90° C. or even up to 100° C. or higher, accomplished if necessary under pressure to avoid ebullition. The hotter the solution becomes, the greater is the proportion of thorium sulfate that is precipitated, such precipitation being improved by agitation. Upon filtering out the precipitate, loss of residual thorium from the acid filtrate, which appears to be constant at about 1 gram $ThO_2$ per liter, is avoided, and subsequent recovery thereof is effected by returning the denuded acid filtrate solution to the selective stripping of the organic solvent. Similarly loss of a smaller proportion of the thorium values, which would otherwise be lost when the original acid solution is selectively stripped by the organic solution, is avoided by recycling the stripped sulfuric acid solution back to the leaching stage.

Other objects of the invention and particular procedural features will become apparent to those skilled in this art upon a review of the following specification and reference to the accompanying drawing, wherein:

FIG. 1 is a flow sheet which represents a presently preferred operating procedure; and FIG. 2 shows a possible detail.

The flow sheet illustrates a tank 10 as constituting a leaching or extraction apparatus into which the thorium containing ore, such as monazite, or other mineral such as a concentrate, is introduced, and in which it is leached for a considerable time at normal temperatures with dilute aqueous sulfuric acid solution (e.g. 13% solution), supplied through a recycle line 12 and an original source line 14. Continuous agitation required is exemplified by a stirrer 15 working in the tank 10. The resultant thorium sulfate acid solution is passed from the tank 10 by a line 16 into a stripping tank 18, such solution having had its pH value desirably adjusted to pH 0.5 to avoid subsequent stripping of ferric iron from the solution.

Into the stripping tank 18 an appropriate immiscible organic stripping solution is introduced by way of a line 20, thorough admixture and good liquid-liquid extraction being assured by agitation as through the medium of a stirrer 22. As indicated in the flow sheet, the organic stripping solution is represented by a 10% solution in kerosene of di-2-ethylhexyl phosphoric acid (DEHPA). To accomplish good concentration of thorium values in the organic solution by the selective extraction, a smaller volume of solvent is employed than the volume of the sulfuric acid solution. In practice a very desirable proportion has been one volume of the organic selective extractant solvent to two volumes of the sulfuric acid solution containing the dissolved thorium sulfate to be stripped out.

Upon intimate admixture of the two solutions to effect optimum extraction, settling is permitted, and the organic solvent layer is removed as by decantation, the extracted sulfuric acid layer being returned to the tank 10 by a line 23 for treatment of a new batch of ore. The decanted organic stripping solution in which the thorium sulfate is now concentrated, is introduced into another tank 25 by way of a line 26. The tank 25 receives strong sulfuric acid solution, supplied as by a line 27, which is in turn employed to strip the thorium sulfate from the organic extractive solution previously used. Here again, the stripping solution is employed in smaller volume than the solution to be stripped. Very desirably one volume of acid stripping solution may be employed to contact two volumes of the organic solution to be stripped, thereby further concentrating the thorium sulfate. The strong sulfuric acid stripping solution may preferably be about 6 N (6 Normal), but it might be stronger such as 8 N or weaker such as 5 N or 4 N or perhaps even still weaker according to economic requirements but 6 N solution seems to give maximum yield. Intimate commingling of the stripping acid solution with the organic solution to be stripped is again effected by adequate agitation such as indicated by a stirrer 28.

Following adequate admixture of the two solutions for stripping purposes, settling is permitted and the two liquid layers are separated as by decantation. Stripped organic solution, with any remaining sulfate, is returned to the first stripping tank 18 by a line 30 for extraction of another batch of initial thorium sulfate in solution in sulfuric acid. The strong sulfuric acid solution, now containing the stripped concentrated thorium sulfate, is passed by a line 32 to a heating vessel 35 which may be heated as by steam coils 36. This vessel 35 may be a pressure vessel so that instead of raising the temperature of the solution only to about 90° C. as would be done in an open vessel, it may be raised to 100° C. or more by reason of applied or developed pressure. Such higher heating may be desirable, inasmuch as more thorium sulfate is precipitated as the temperature in the vessel 35 increases. Since adequate precipitation of thorium sulfate crystals is effected under agitation, means for affording such agitation may be employed, this being represented by another stirrer 38. Or, precipitation may be facilitated by seeding the heated system with $Th(SO_4)_2 \cdot H_2O$ crystals.

Maximum crystallization or precipitation having been effected, the batch in the tank 35 is then passed to a filter 40, from which the separated thorium sulfate precipitate or crystal product is recovered. The acid filtrate is passed from the filter 40 by a line 42 through a cooler 44 and recycled back to the stripping vessel 25, whereby the typical one gram of $ThO_2$ equivalent per liter retained therein is recovered. Make-up acid may be supplied by a line 45. Where necessary to avoid build-up anywhere in the recycle system of objectionable constituents such as iron, aluminum and calcium, an appropriate bleed-off is used, such as indicated at 48 to take off from the recycle line 42 and as indicated at 50 to take off from the initial acid return line 23.

All percentages herein given are by weight.

With respect to variations and ranges possible in the procedure above described, while it has been indicated that a 13% sulfuric acid solution is employed in the leaching operation in tank 10, this may be considerably varied, depending of course upon the time to be employed in the leaching operation and the proportions of solution to ore. This might vary, for example, between about 10% sulfuric acid and 35% sulfuric acid. In a particular instance where a 13% solution has been used, the weight of solution was approximately double the weight of fine ground ore employed.

The leaching temperature may be the ambient or room temperature, and thus could vary from around 50° F. to 125° F. In practice, however, in order to obtain the best solution, it may be preferable to operate in the lower range such as between 50° F. and 65° F., for example. In the leached ore above mentioned, the thorium content was about 0.5% and the clear filtrate solution obtained contained about 1.54 grams $ThO_2$ per liter. In addition, the iron content was about 5% and the clear filtrate contained about 1 gram of iron per liter. The acidity of this solution was adjusted to pH 0.5 to prevent ferric iron from subsequently entering the organic phase during the solvent extraction procedure. If the iron is in the ferrous form, the pH value may be above pH 0.8 (to obtain the results desired) which possibly is a critical pH value if the iron is substantially in the ferric form and the avoidance of entry of ferric iron into the organic solvent extraction solution is desired. However, the same result can be attained by reducing the ferric iron to ferrous condition by means of steel wool, or scrap iron, or steel turnings, or chemical reducers such as hydrazine, nascent hydrogen, sulfur dioxide, and the like. Otherwise the above indicated pH adjustment to reduce affinity is employed. Similarly, if any of the so-called rare earth metals are present, it may sometimes be desirable to reduce the pH value to one sufficiently low to destroy the affinity of such rare earth metals for the organic phase to be used.

The pH values having been adjusted as above indicated, the sulfuric acid solution containing dissolved thorium sulfate was subjected to intimate contact with the indicated minor proportion of the immiscible organic solvent extraction solution, thereby reducing the indicated 1.54 grams of $ThO_2$ per liter to less than 0.04 gram per liter. As previously indicated, this solution was a kerosene solution containing about 10% of the mentioned di-2-ethylhexyl phosphoric acid (DEHPA). However, for this particular extractant, the DEHPA value may vary between any small proportion that will be effective (e.g. 1%) and about 15% which appears to be the desirable and appropriate practical and economical maximum. Other water-immiscible solvents than kerosene could be employed which are chemically inert in the system and in which the organic agent and its thorium complex are soluble. These might be any other unsaturated petroleum solvent fraction or hydrocarbon solvent having the indicated characteristics. Other liquid extractors than the mentioned DEHPA for the present liquid-liquid extraction would be any of the known liquid organic cationic extractors such as dodecyl phosphoric acid, dioctyl phosphoric acid, monoheptyl decyl phosphoric acid, oleic acid, linolenic and similar unsaturated fatty acids. While the extractant has been referred to as a "solvent," the active constituent (such as the mentioned DEHPA) is for practical purposes simply a liquid ionic exchanger, of the organic cationic extractor category above indicated.

As to proportions of thorium-sulfate-containing sulfuric acid solution and the immiscible organic selective solvent, for the purpose of this invention it is important to employ a smaller volume of the immiscible organic solvent (containing the cationic extractor) than of the aqueous sulfuric acid solution in order to concentrate the thorium sulfate in the organic selective solvent. While perhaps the organic solvent could exceed the acid solution, there would be no point in such proportion because of the later detriment in treating a lower concentration of thorium sulfate. While it might be in order to employ a 1:1 ratio of the two solutions, it is preferable both from the economic and procedural standpoints to employ less of the organic solvent than of the acid solution. This might be in the order of one volume of immiscible organic solvent to three or four volumes of the aqueous acid solution, but we have found it very desirable, efficient and economical to employ a ratio of one volume of the organic stripping solvent (e.g. cationic extractor in kerosene) to two volumes of the sulfuric acid solution. After proper agitation and settling, the decanted organic stripping solvent has removed from the acid solution substantially all of the thorium sulfate, such as represented by the above indicated reduction of 1.54 grams to 0.04 gram. The operating temperature in this step is conveniently the ordinary room or plant temperature.

The thorium sulfate having been concentrated in the smaller volume of organic selective extractive solvent, such thorium sulfate is now transferred to a solution, in the tank 25, from which it may be precipitated by heat in the tank 35. Preferably such stripping solution should again be of smaller volume in order further to concentrate the thorium sulfate content. The stripping solution employed here is a strong sulfuric acid solution, a 6 Normal solution at present being preferred and possibly, so far as now known, optimum, although an 8 N solution may be used, or possibly up to 12 Normal (33%). If weaker solutions than a 6 N solution are employed the yields apparently are not so high. A likely minimum is 2 Normal (5½%). However, such weaker solutions involve greater heat input in the next step and greater cooling cost prior to subsequent recycling. A desirable working ratio of strong acid stripping solution to immiscible organic solution to be stripped has been 1:2, that is one volume of the strong aqueous acid to two volumes of the organic solution. It is possible, but less desirable, to employ one volume of the aqueous acid to ten volumes of the organic solution, or any range up to the mentioned 1:2 ratio. It is, of course, possible to employ a 1:1 ratio and suffer the loss of the advantages of greater concentration of the thorium sulfate in the acid solution.

Desirably the mount of strong acid solution should be in the order of about 1 liter per 11.3 grams of thorium sulfate ($Th(SO_4)_2 \cdot 4H_2O$) or 6 grams of $ThO_2$ equivalent. Here again the temperature employed may be the usual ambient plant or room temperature. The time for exchange of thorium sulfate between the thorium rich solution and the selective solvent having a greater affinity for the thorium sulfate, which is the strong sulfuric acid solution for the second extraction step, is commonly in the order of about 10 minutes in both the first and second extractions. Each extraction may, if desired, be in a plurality of stages of some well known or preferred type such as indicated in FIG. 2, rather than in a single stage as in FIG. 1. In plural stages, the time for each stage is correspondingly less.

Maximum transfer of the thorium sulfate from the immiscible organic solvent to the strong sulfuric acid selective solvent having been completed, such strong acid sulfate solution (which in the specific example above contained about 5.78 grams equivalent $ThO_2$ per liter) is next transferred to the heating vessel 35, which preferably is to be a pressure vessel if temperatures around the boiling point are employed, the temperature being then raised to around 90° C., or up to the boiling temperature as previously indicated, to effect precipitation of the thorium sulfate by reason of the fact that it is less soluble in hot solutions than in cold solutions. In general, the higher the temperature, the greater the percentage of precipitation of thorium sulfate. At a working temperature of about 90° C. with a 6 N sulfuric acid solution, all the thorium sulfate is precipitated except about 1 gram per liter of equivalent $ThO_2$, which appears to represent a constant content of residual thorium sulfate. This content is of course picked up by the recycling of the filtrate from the filter 40 to the second extraction vessel 25.

Under these circumstances the recovery of thorium has been around 80%.

In addition to using the above described process for the recovery of thorium, it may of course also be used for kindred metals dissolved by dilute sulfuric acid, and rejectable from strong sulfuric acid solution of the indicated nature upon heating to around the boiling point or higher, sulfates of such metals being selectively extractible from the original sulfuric acid solution by an immiscible organic selective solvent, and being in turn extractible from such organic solvent by a strong sulfuric acid solution having greater affinity for the metal and therefore being much stronger than the original sulfuric acid leaching solution. Such metals may be cerium, gadolinium, yttrium and ytterbium.

The invention claimed is:

1. In a process for recovering thorium, the steps of: leaching a thorium-containing mineral with dilute aqueous sulfuric acid and thereby obtaining thorium sulfate in the acid solution; separating the resultant thorium-rich acid solution and intimately contacting it with a minor proportion of an immiscible organic selective extraction solvent for the thorium content selected from the group consisting of dialkyl phosphoric acid, dodecyl phosphoric acid, dioctyl phosphoric acid, monoheptyl decyl phosphoric acid, oleic acid, and linolenic acid; separating the immiscible organic solvent with its contained thorium; intimately contacting said organic solvent with a minor proportion of strong aqueous sulfuric acid having selective affinity for the thorium content of the organic solvent, thereby stripping and concentrating the thorium sulfate in such strong sulfuric acid solution; heating such strong sulfuric acid solution to the neighborhood of 90° C., thereby precipitating a major proportion of the thorium sulfate; and recovering the precipitated thorium sulfate from the acid solution.

2. A process as in claim 1 wherein the strong sulfuric acid solution largely denuded of its thorium content is recycled to again strip a quantity of thorium-rich organic solvent.

3. A method of recovering from its ores, a metal selected from the group consisting of thorium, cerium, gadolinium, yttrium, and ytterbium, including the steps of: leaching a mineral containing such metal with aqueous sulfuric acid solution to obtain the sulfate of the metal in the acid solution; recovering such acid solution; selectively extracting the metal sulfate from said acid leaching solution by a dialkyl phosphoric acid organic cation exchange liquid immiscible in the acid solution; separating the immiscible exchange liquid with its dissolved metal sulfate from the acid solution; selectively dissolving the metal sulfate from said organic liquid in a minor proportion of strong sulfuric acid stripping solution, thereby concentrating the sulfate in such sulfuric acid stripping solution; heating such strong sulfuric acid stripping solution containing said metal sulfate to a temperature at least about as high as 90° C., thereby precipitating a major proportion of the metal sulfate; and recovering the precipitated metal sulfate from such strong acid solution.

4. A method as in claim 3 wherein the immiscible cation exchange liquid is a solution of about 2% to 15% of di-2-ethylhexyl phosphoric acid in kerosene.

5. A method as in claim 1 wherein the strong sulfuric acid stripping solution largely denuded of the metal sulfate is recycled to again strip a quantity of metal sulfate-rich organic cation exchange liquid.

6. A continuous method of recovering thorium comprising: continuously leaching a thorium-containing feed material with a sulfuric acid solution; continuously extracting thorium from the leaching solution with a dialkyl phosphoric acid selective solvent incompletely miscible in the leaching solution; continuously separating the thorium-containing extract from the leaching solution; continuously recirculating the leaching solution after said extraction for further use in leaching said feed material; continuously extracting thorium from the selective solvent extract with a second sulfuric acid solution; continuously recirculating the selective solvent extract for further use in selective solvent extraction of thorium from the leaching solution; continuously heating the said second sulfuric acid solution to form a thorium-containing precipitate; continuously separating and recovering the said precipitate; and continuously recirculating the heated second sulfuric acid solution after separating said precipitate therefrom for use in said extraction of thorium from the selective solvent extract.

7. A process for recovering thorium including the steps of: leaching a thorium-containing mineral with aqueous sulfuric acid solution to obtain thorium sulfate in the acid solution; selectively extracting the thorium sulfate from said acid leaching solution by a dialkyl phosphoric acid organic cationic exchange liquid immiscible in the acid solution; separating the thorium-containing organic liquid from said acid leaching solution; selectively dissolving the thorium sulfate from said organic liquid in a strong sulfuric acid stripping solution having greater affinity for the thorium sulfate than the organic liquid; and recovering the thorium values from the strong acid stripping solution by heating it to approximately the boiling point to precipitate the thorium sulfate.

8. A process for recovering thorium including the steps of: leaching a thorium-containing mineral with aqueous sulfuric acid solution to obtain thorium sulfate in the acid solution; selectively extracting the thorium sulfate from said acid leaching solution by a dialkyl phosphoric acid organic cationic exchange liquid immiscible in the acid solution; separating the thorium-containing organic liquid from said acid leaching solution; selectively dissolving the thorium sulfate from said organic liquid in a strong sulfuric acid stripping solution having greater affinity for the thorium sulfate than the organic liquid; recovering the thorium values from the strong acid stripping solution; and recycling the strong sulfuric acid solution largely denuded of its thorium content to again strip a quantity of thorium-rich organic solvent.

9. A process as in claim 8 wherein the leaching and solvent extraction steps are conducted at around normal plant temperatures, and the strong sulfuric acid stripping solution has a concentration at least as high as 4 N.

10. A process as in claim 8 wherein the immiscible organic extraction solvent is a solution of about 2% to 15% of di-2-ethylhexyl phosphoric acid in kerosene.

11. A process as in claim 8 wherein the acidity of the original thorium-rich aqueous acid solution is adjusted to reduce solution iron by the organic extraction liquid.

12. A process for recovering thorium including the steps of: leaching a thorium-containing mineral with aqueous sulfuric acid solution to obtain thorium sulfate in the acid solution; selectively extracting the thorium sulfate from said acid leaching solution by a dialkyl phosphoric acid organic cationic exchange liquid immiscible in the acid solution; separating the thorium-containing organic liquid from said acid leaching solution; selectively dissolving the thorium sulfate from said organic liquid in a strong sulfuric acid stripping solution having greater affinity for the thorium sulfate than the organic liquid; and recovering the thorium values from the strong acid stripping solution, the acidity of the original thorium-rich aqueous acid solution being adjusted to reduce the dissolving of iron by the organic extraction liquid.

13. A process for recovering thorium including the steps of: leaching a thorium-containing mineral with aqueous sulfuric acid solution to obtain thorium sulfate in the acid solution; selectively extracting the thorium sulfate from said acid leaching solution by a dialkyl phosphoric acid organic cationic exchange liquid immiscible in the acid solution; separating the thorium-containing organic liquid from said acid leaching solution; selectively dissolving the thorium sulfate from said organic liquid in a strong sulfuric acid stripping solution having greater affinity for the thorium sulfate than the organic liquid; recovering the thorium values from the strong acid stripping solution by heating it to about 90° C., thereby precipitating a major proportion of the thorium sulfate; and recycling the strong sulfuric acid stripping solution largely denuded of its thorium values to again strip a quantity of thorium-rich organic solvent.

References Cited in the file of this patent

UNITED STATES PATENTS

| | | |
|---|---|---|
| 1,351,489 | Ryan | Aug. 31, 1920 |
| 2,578,623 | Auselin et al. | Dec. 11, 1951 |
| 2,815,262 | Bridger et al. | Dec. 3, 1957 |
| 2,796,320 | Spedding et al. | June 18, 1957 |

OTHER REFERENCES

Gercke: United States Atomic Energy Commission Report UCRL-1493. (Copy in Sci. Library.)

Gmelin's Handbuch der Anorganischen Chemie, vol. 44, Thorium, 1955, pages 33, 34, 36, 37, 38, 60, 66-69, 291. (Copy in Library.)

Brown: ORNL-1384, June 30, 1952 (date declassified Mar. 7, 1957), pp. 109-120. (Copy in Scientific Library.)

Gmelin's Handbuch der Anorganischem Chemie, vol. 44, Thorium, 1955, pp. 283-291. (Copy in Scientific Library.)

Mellor: Comprehensive Treatise on Inorganic and Theoretical Chemistry, vol. 7 (1927), pp. 178, 179 and 240-243. (Copy in Div. 59.)

Ross: TID-7508, April 1, 1955 (date declassified Dec. 15, 1955), pp. 6-20 and 55-64. (Copy in Scientific Library.)

UNITED STATES PATENT OFFICE

CERTIFICATE OF CORRECTION

Patent No. 2,993,752                      July 25, 1961

Clifford J. Lewis et al.

It is hereby certified that error appears in the above numbered patent requiring correction and that the said Letters Patent should read as corrected below.

Column 5, line 71, for the claim reference numeral "1" read -- 3 --.

Signed and sealed this 5th day of December 1961.

(SEAL)
Attest:

ERNEST W. SWIDER
Attesting Officer

DAVID L. LADD
Commissioner of Patents
USCOMM-DC